(12) United States Patent
Levy et al.

(10) Patent No.: US 12,252,251 B2
(45) Date of Patent: Mar. 18, 2025

(54) PAYLOAD RELEASE APPARATUS FOR UNMANNED AERIAL VEHICLE

(71) Applicant: Flytrex Aviation Ltd., Tel Aviv (IL)

(72) Inventors: Rotem Izchak Levy, Shlomi (IL); Nadav Meir, Tel Aviv (IL); Aviram Klaiman, Kfar Saba (IL); Tomer Gilad, Hod Hasharon (IL)

(73) Assignee: Flytrex Aviation Ltd., Tel Aviv (IL)

( * ) Notice: Subject to any disclaimer, the term of this patent is extended or adjusted under 35 U.S.C. 154(b) by 0 days.

(21) Appl. No.: 18/310,192

(22) Filed: May 1, 2023

(65) Prior Publication Data
US 2024/0367791 A1  Nov. 7, 2024

(51) Int. Cl.
*F16B 45/02* (2006.01)
*B64D 1/12* (2006.01)

(52) U.S. Cl.
CPC .............. *B64D 1/12* (2013.01); *F16B 45/021* (2021.05); *F16B 45/036* (2021.05)

(58) Field of Classification Search
CPC .............................. F16B 45/021; F16B 45/036
USPC ....... 248/339, 340, 341, 690, 691, 692, 301, 248/303, 304
See application file for complete search history.

(56) References Cited

U.S. PATENT DOCUMENTS

| | | | |
|---|---|---|---|
| 2,992,465 A * | 7/1961 | Gale | F16B 45/036 |
| | | | 116/63 P |
| 5,388,367 A | 2/1995 | Rydell | |
| 2016/0095420 A1* | 4/2016 | Moreau | A45F 5/021 |
| | | | 248/317 |
| 2018/0035830 A1* | 2/2018 | Arakawa | F16B 45/036 |
| 2020/0216174 A1 | 7/2020 | Prager | |

* cited by examiner

*Primary Examiner* — Alfred J Wujciak
(74) *Attorney, Agent, or Firm* — M&B IP Analysts, LLC

(57) ABSTRACT

A payload release apparatus (PRA) is configured to expel payload efficiently at a delivery location. In an embodiment, the PRA includes a top portion, the top portion including a connector adapted to connect to a first end of a tether; a hook portion connected to the top portion, the hook portion including: a shank, a vertex, a high point, and a gap defined between the high point and the shank; and an elastic member, the elastic member blocking the gap defined between the high point and the shank of the hook portion, the elastic member having a relaxed position and a stretched position.

9 Claims, 14 Drawing Sheets

PAYLOAD RELEASE APPARATUS FOR UNMANNED AERIAL VEHICLE

TECHNICAL FIELD

The present disclosure relates generally to unmanned aerial vehicles performing on-demand delivery, and specifically to a payload release apparatus.

BACKGROUND

As aviation technologies progress, drone delivery has become a reality for many. The efficiency of performing a payload delivery with a drone is increasingly becoming lucrative. Drones, also referred to as unmanned aerial vehicles, can perform point to point delivery bypassing traffic jams, which allows them to perform faster deliveries. Thus, a drone can, by virtue of utilizing an aerial path rather than a ground one, perform many more deliveries per hour than a ground base vehicle can, especially if the ground based vehicle is operated by a human.

Utilizing drone deliveries in place of ground vehicles may also decrease the number of cars, motorbikes, and other such vehicles used for delivery, thus decreasing the likelihood of an accident between such a vehicle and a pedestrian.

However, it is recognized that drone deliveries are not without challenges. Specifically, payload release has noted challenges, as the payload may be delivered to a user inexperienced with aviation regulations. Landing a drone in a residential backyard, for example, carries the risk a child might approach the vehicle while blades are spinning.

These often massive blades can cause serious injury, therefore landing must be performed with safety measures in place.

An alternative to landing is deploying the payload with a parachute. However, this too has disadvantages, as the parachute may not always deploy fast enough, especially if the drone is hovering too low relative to the ground. Even when a parachute is deployed and the payload descends at safe speeds, it is not guaranteed that the payload will not land outside of the intended target area, since parachutes are at the whim of the winds.

Yet another alternative is releasing the payload with a winch system, where the payload is attached to a tether, descending from the drone towards the ground. This method also carries several risks. One such risk is that the tether may be pulled, maliciously or otherwise, which may result in a flight malfunction, causing the drone to crash. Another risk is that once the payload arrives to ground, the tether may become tangled with the payload and unable to be released.

All these complications add to delivery time, decreasing the amount of deliveries which can be performed by the drone in a given timeframe, and include a risk to a human operator or payload recipient.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

One general aspect includes a payload release apparatus (PRA). The payload release apparatus also includes a top portion, the top portion including a connector adapted to connect to a first end of a tether; a hook portion connected to the top portion, the hook portion including: a shank, a vertex, a high point, and a gap defined between the high point and the shank; and an elastic member, the elastic member blocking the gap defined between the high point and the shank of the hook portion, the elastic member having a relaxed position and a stretched position.

Implementations may include one or more of the following features. The PRA may include: a first anchor placed at the top point; and a second anchor placed on the high point, where the elastic member is connected to the first anchor and to the second anchor. The elastic member is positioned in the first channel, the second channel, and the third channel. The stopper is further connected to the connector. The connector includes a chamber, the chamber having a cross section which is equal to a cross section of the stopper. The cross section of the stopper has a trapezoidal shape. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
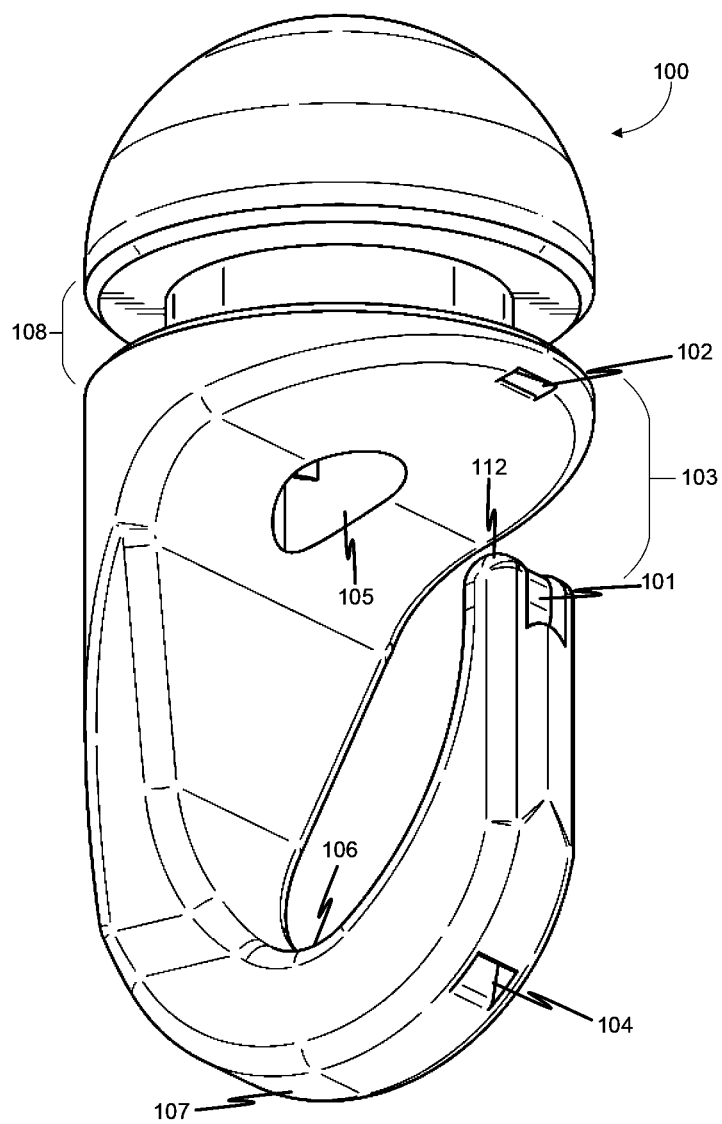
FIG. 1 is an example diagram of a front isometric view of a payload release apparatus, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include an apparatus which performs efficient payload release from an unmanned aerial vehicle (UAV), also referred to as a drone. In an embodiment, the payload release apparatus includes a tether attached to a hook, the hook having an elastic member, such that the elastic member is extended between a point on the hook and a point on a shank of the hook.

In certain embodiments, a payload includes a handle which is affixed to the hook, such that the handle is resting in a gap of the hook. In an embodiment, the gap is defined between the point of the hook and a point of the shank. In some embodiments, the portion of the hook between the point of the hook and the point of the shank is referred to as a bend.

In some embodiments, the payload handle resting on the hook bend (i.e., within the gap) causes tension on the elastic member. The force generated by gravity based on the mass of the payload causes tension to remain on the elastic member. Once the payload touches the ground (or other surface) and a normal force is applied to the payload (i.e., the force of gravity is balanced out), the mass based force (i.e., gravity) is negated and the elastic member contracts, expelling the payload handle out from the hook. Thus, the payload is immediately released and the elastic member expels the handle and prevents an undesired coupling.

This is advantageous as it eliminates the need for intervention when disengaging the hook, and therefore the drone, from the payload. Furthermore, a gravity based solution does not require use of sensors (e.g., to sense when a payload is on the ground), and therefore uses less power, allowing more power to be utilized by the drone, UAV, and the like, for the purpose of flying, thereby increasing the vehicle's ability to maneuver between locations.

FIG. 1 is an example diagram of a front isometric view of a payload release apparatus 100, implemented in accordance with an embodiment. The payload release apparatus 100 includes a hook portion and a top portion, disposed over the hook portion. The top portion receives a tether from a drone (or a winch), as illustrated in the example embodiments below.

In an embodiment, the hook includes a curved surface having a vertex 310 (i.e., the lowest point of the curved surface of the hook). In some embodiments, the curved surface is referred to as a bend. The curved surface has an inner portion 106 and an outer portion 107. A payload having a handle may be affixed to the hook 100, such that a handle of the payload rests substantially on the inner portion 106 of the vertex 310.

The hook further includes an opening 103 through which a handle of a payload may be received. The opening 103 (also referred to as a "gap") is defined between a high point 112 of the hook, which is taller than the inner portion 106 of the vertex 310, and the top portion.

In an embodiment, the hook includes a first anchor 101 and a second anchor 102. In an embodiment, an elastic member is affixed to the first anchor 101 at one end of the elastic member, and to the second anchor 102 at a second end of the elastic member.

In some embodiments, the first anchor 101 and second anchor 102 are each an opening to a channel through which an elastic member may be threaded. For example, in an embodiment, an elastic member is threaded through the second anchor 102 to the first anchor, and into a channel defined by an opening of the first anchor 101 and a first opening 104.

In certain embodiments, the elastic member is, for example, a rubber band, a bungee cord, an elastic cord, a knitted elastic cord, a braided elastic cord, a combination thereof, and the like. In some embodiments, the elastic member, discussed in more detail below, is in a relaxed state, or a stretched state. In an embodiment, the relaxed state includes a first level of elastic deformity, while the stretched state includes a second level of elastic deformity which is greater than the first level of elastic deformity. For example, in an embodiment, the first level of elastic deformity includes no, or substantially no, elastic deformity (i.e., the elastic member is not stretched), and the second level of elastic deformity is achieved by stretching the elastic member so that the length of elastic member in the second level of elastic deformity is greater than the length of the elastic member in the first level of elastic deformity.

In some embodiments, the hook includes an opening 105 at a top portion, through which a tether is optionally affixed into the top portion. For example, in an embodiment, the opening 105 includes an eye, eyelet, and the like, to which a tether is optionally affixed. The opening 105 is discussed in more detail below.

In an embodiment, a slit 108 (also referred to as a channel) is defined between a top portion of the hook, and the top portion of the payload release apparatus 100. In some embodiments, the slit 108 is utilized for example for storing the payload release apparatus 100 in a housing, to prevent movement of the payload release apparatus 100 during transit. In some embodiments, the slit 108 extends around the entire payload release apparatus 100, or a portion thereof. In some embodiments, a plurality of slits may be utilized. In certain embodiments, a slit includes a channel, a depression, and the like, into which an extending member of a housing can protrude to affix the payload release apparatus to the housing.

Figure 2:
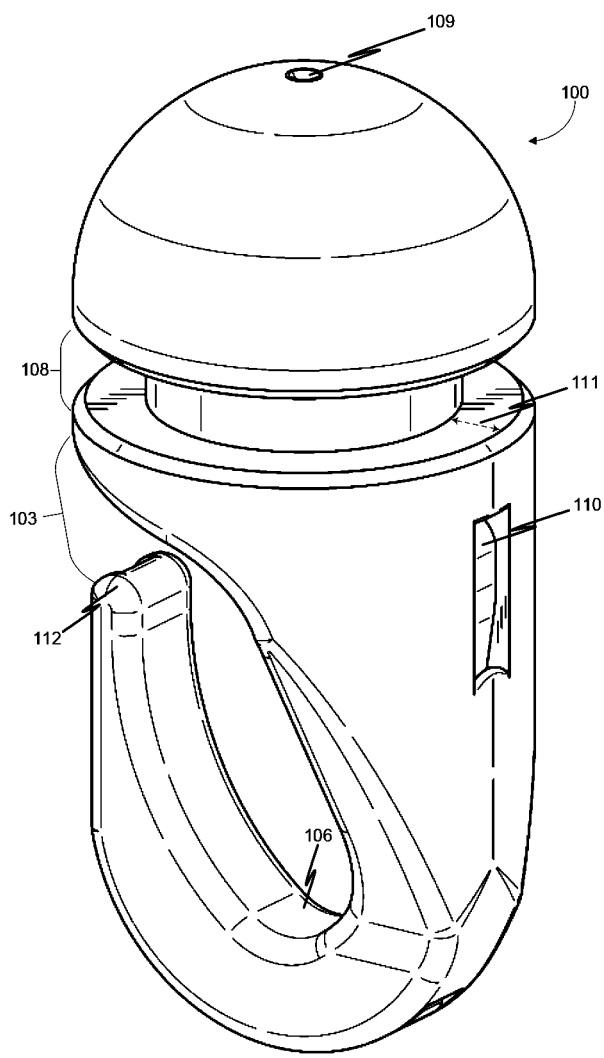
FIG. 2 is an example diagram of a back isometric view of the payload release apparatus, implemented in accordance with an embodiment.

FIG. 2 is an example diagram of a back isometric view of the payload release apparatus 100, implemented in accordance with an embodiment. In an embodiment, the portion of the payload release apparatus 100 includes an opening 109, through which a tether is threaded to affix the payload release apparatus 100 to a first end of a tether. In an embodiment, a second end of the tether is connected to a UAV, drone, and the like.

In an embodiment, a channel is defined between the opening 109 and the opening 105, shown in greater detail below. In an embodiment, the opening 109 is configured to connect to a tether. For example, in some embodiments, the opening 109 includes a connector which is configured to accept a connection from a tether (such as discussed in more detail below). In some embodiments, the channel is fully enclosed (other than a first opening and a second opening). In another embodiment, the channel is partially enclosed.

In an embodiment, a slit 108 which is defined between the top portion of the payload release apparatus (PRA) and the hook portion of the PRA, has a depth 111. In some embodiments, the depth may be defined by an outer perimeter, and an inner perimeter.

In certain embodiments, a back of the hook portion (i.e., the shank), which is disposed opposite to the high point 112, may include an opening 110, such that a channel is defined between the opening 110 and an opening of the anchor 102.

Figure 3:
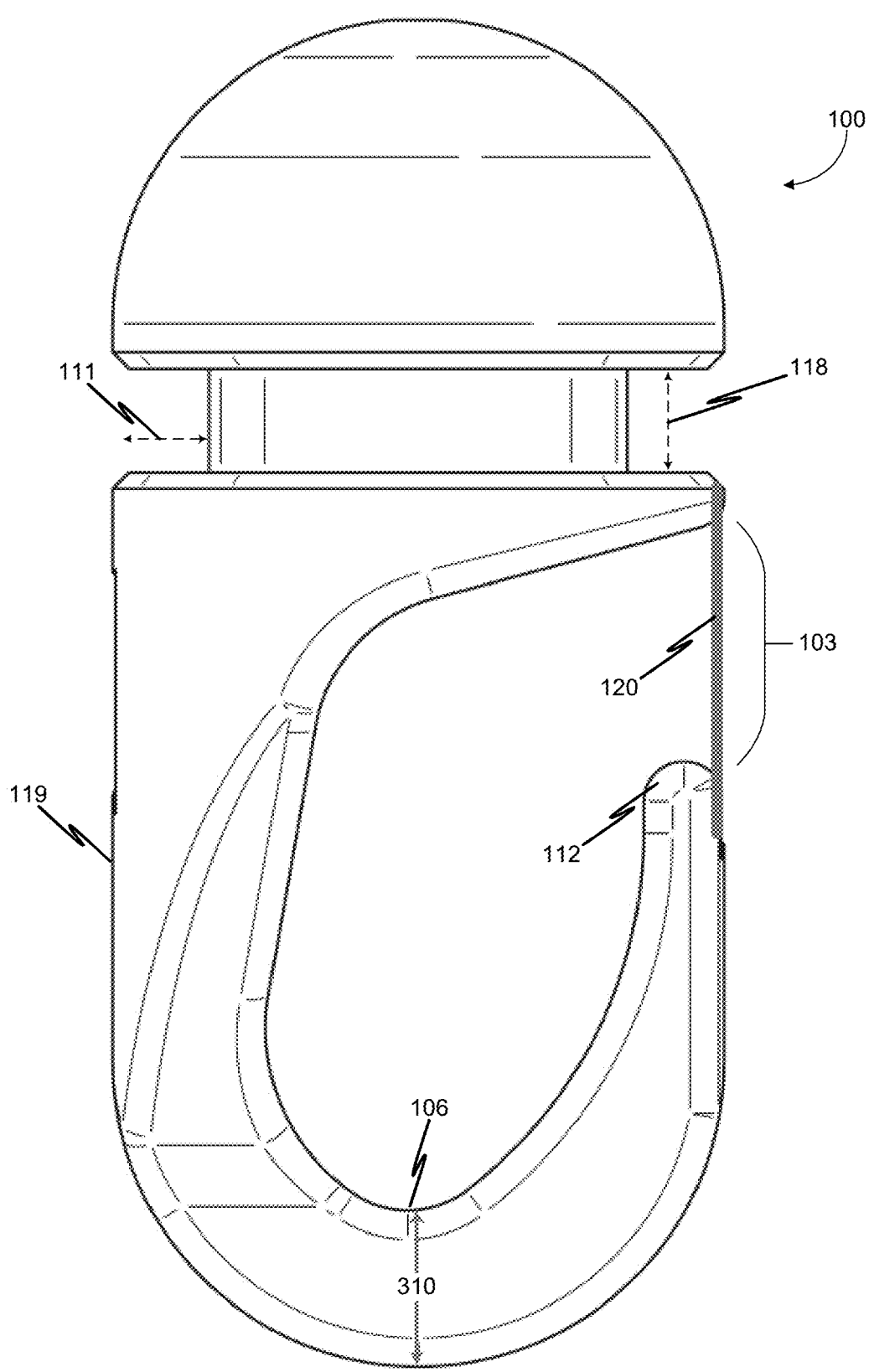
FIG. 3 is an example diagram of a side view of the payload release apparatus, implemented in accordance with an embodiment.

FIG. 3 is an example diagram of a side view of the payload release apparatus 100, implemented in accordance with an embodiment. In certain embodiments, the hook portion of the PRA 100 includes a gap 103, which is defined between the high point 112 and the anchor 102. In an embodiment, the gap 103 is opposite to the shank 119, which is the back of the hook portion. In an embodiment, the gap 103 is defined between the high point 112 and another point on an inner surface of the shank 119, wherein the inner surface of the shank 119 is connected to the inner portion 106 of the vertex.

In certain embodiments, an elastic member 120 is position to block the gap 103, partially, fully, and the like. In an embodiment, the elastic member 120 is affixed between two points which define the gap 103. In certain embodiments, a plurality of elastic members are utilized. In an embodiment, the elastic member 120 is in a relaxed state (or relaxed position), initially positioned to block the gap 103. In an embodiment, in order to be caught on the hook, a loop (e.g., a handle of a payload) must apply sufficient force in order to elastically deform the elastic member 120 to a stretched state (or stretched position), so that the handle, loop, and the like, can come into contact with the inner portion 106 of the vertex.

Figure 4A:
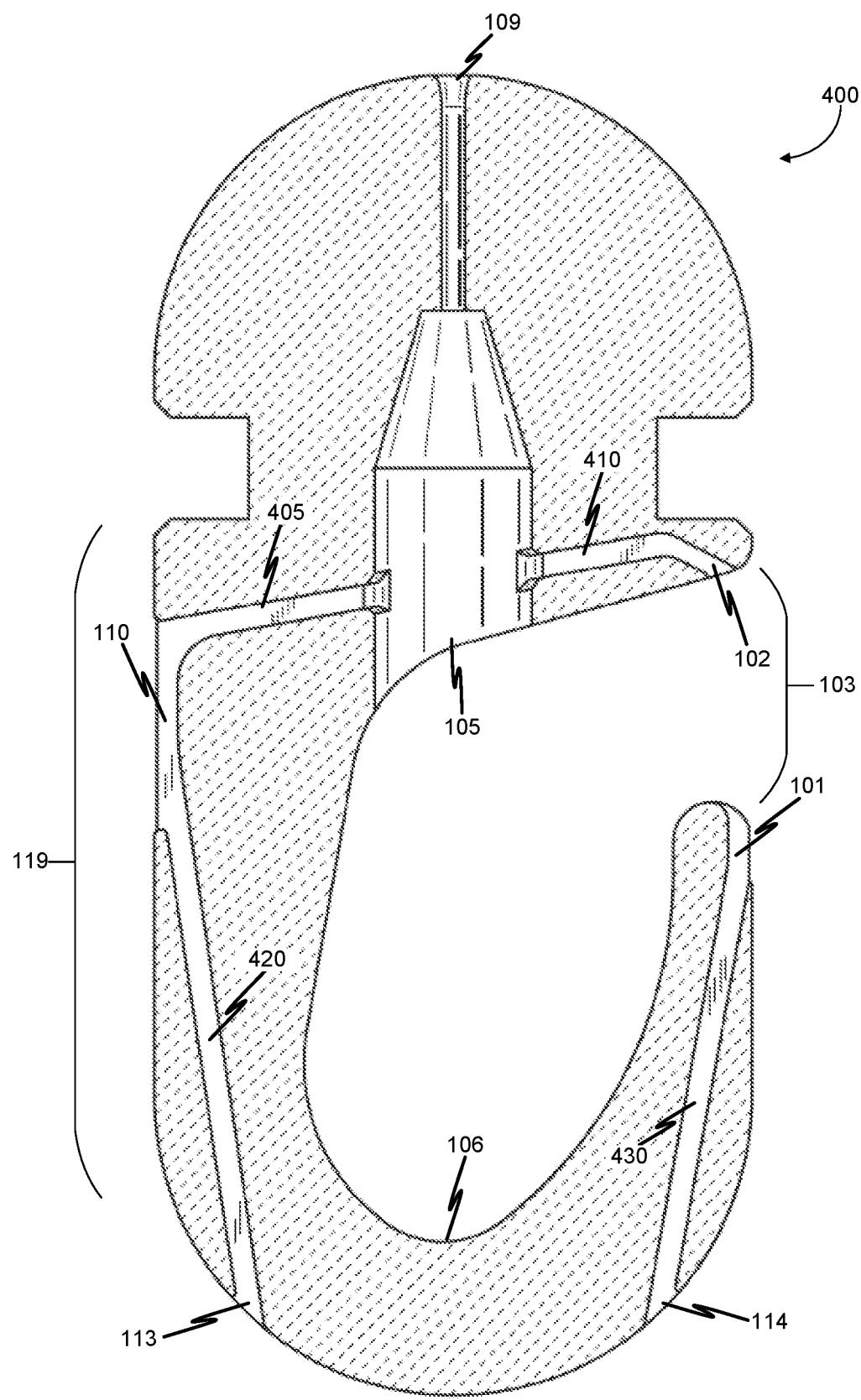
FIG. 4A is an example diagram of a cross section view of the payload release apparatus (PRA), implemented in accordance with an embodiment.
Figure 4B:
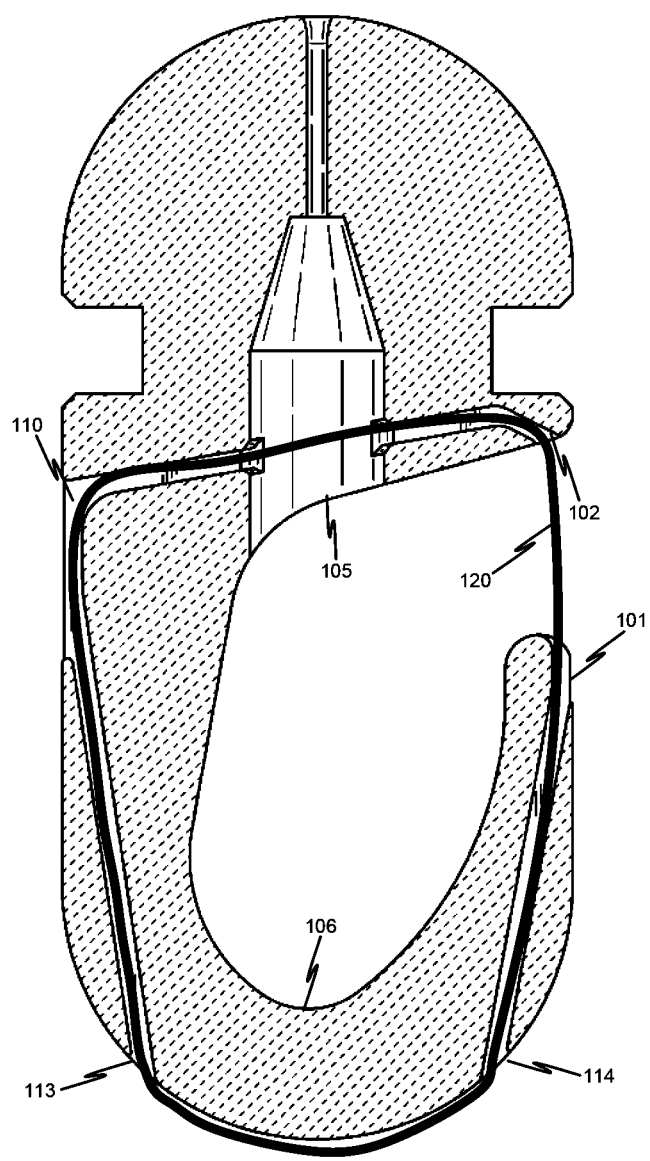
FIG. 4B is an example diagram of a cross section view of the payload release apparatus having an elastic member positioned therein in a relaxed state, implemented in accordance with an embodiment.
Figure 4C:
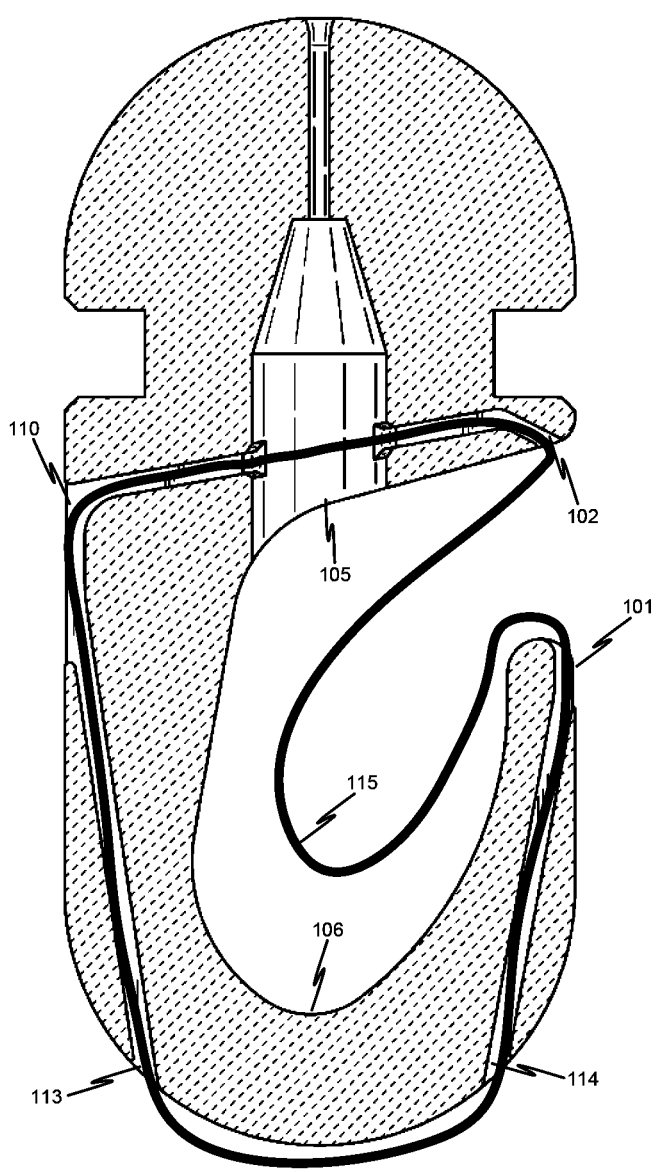
FIG. 4C is an example diagram of a cross section view of the payload release apparatus with the elastic member in a stretched state, implemented in accordance with an embodiment.
Figure 4D:
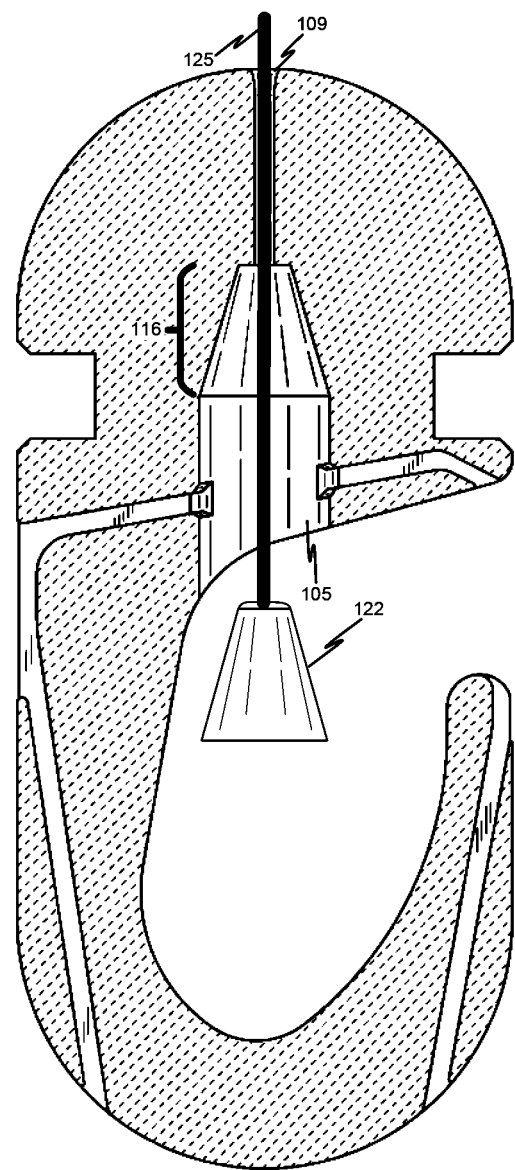
FIG. 4D is an example diagram of a cross section view of the payload release apparatus with a tether connection in a first position, implemented in accordance with an embodiment.
Figure 4E:
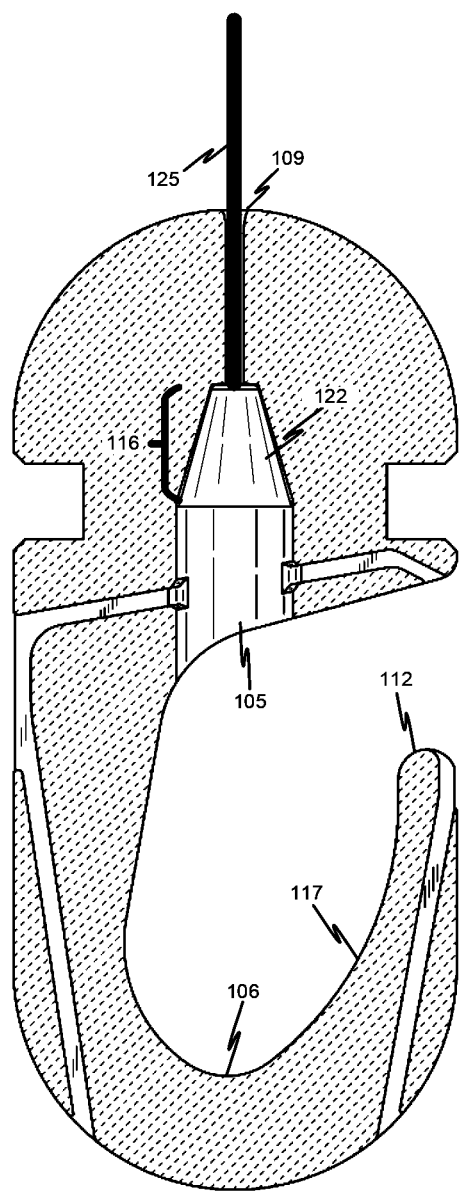
FIG. 4E is an example diagram of a cross section view of the payload release apparatus with a tether connection in a second position, implemented in accordance with an embodiment.

Reference is now made to FIGS. 4A through 4E. FIG. 4A is an example diagram of a cross section view of the payload release apparatus (PRA) 400, implemented in accordance with an embodiment. FIG. 4B is an example diagram of a cross section view of the payload release apparatus 400 having an elastic member 120 positioned therein in a relaxed state, implemented in accordance with an embodiment. FIG. 4C is an example diagram of a cross section view of the payload release apparatus 400 with the elastic member 120 in a stretched state, implemented in accordance with an embodiment. FIG. 4D is an example diagram of a cross section view of the payload release apparatus 400 with a tether connection in a first position, implemented in accordance with an embodiment. FIG. 4E is an example diagram of a cross section view of the payload release apparatus 400 with a tether connection in a second position, implemented in accordance with an embodiment.

In some embodiments, the tether connection includes a tether 125 and a stopper 122. In an embodiment, the tether 125 is a chord, a rope, combinations thereof, and the like.

In some embodiments, a first channel 410 is defined between an opening of the anchor 102 and the opening 105. In an embodiment, the first channel 410 is defined between the opening of the anchor 102 and a top back opening 110, wherein the top back opening 110 is on an outer surface of the shank 119. In an embodiment, a secondary first channel 405 is defined between the opening 105 and the top back opening 110.

In some embodiments, a second channel 420 is defined between the top back opening 110 and a bottom back opening 113. In certain embodiments, a third channel 430 is defined between a bottom front opening 114 and an opening of the anchor 101. This allows, in an embodiment, threading an elastic member 120 through the PRA 400, resulting in the elastic member 120 blocking the gap 103, partially, substantially, fully, and the like.

In an embodiment, where the elastic member 120 is in a stretched position, a portion 115 of the elastic member 120 will be in closer proximity to the inner portion 106 of the vertex of the hook. For example, in an embodiment, the portion 115 of the elastic member 120 is a portion of the elastic member 120 which is in contact with a loop (e.g., a handle) which is affixed to the payload.

In some embodiments, a tether 125 is threaded through the opening 109 of the top portion of the PRA, through a chamber 116 to the opening 105. In an embodiment, a channel defined between the opening 109 and the chamber 116 has a first width, and the chamber has a width at a portion of the chamber which is larger than the width of the channel. In certain embodiments, the width of the chamber 116 is equal to, smaller than, and the like, the width of the opening 105.

In an embodiment, the tether 125 is connected to a stopper 122 at a first end, and the tether 125 is coupled to a UAV at a second end of the tether 125. In some embodiments, the tether 125 is connected to the drone via a winch (i.e., the tether 125 is connected to the winch, and the winch is connected to, or is a part of, the UAV). In an embodiment, the stopper 122 and the chamber 116 connect the tether to the PRA, thereby forming a connector.

In an embodiment, the stopper 122 has a cross section which is substantially equal in shape to a cross section of the chamber 116. In certain embodiments, the stopper 120 has a substantially trapezoid cross section, corresponding to a substantially trapezoid cross section of the chamber 116. In such embodiments, a bottom side of the stopper 122 is wider than a top side of the stopper 122. Thus, when a force is applied on the tether in the direction of the winch, the stopper 122 is pressure fit into the chamber 116.

Figure 5A:
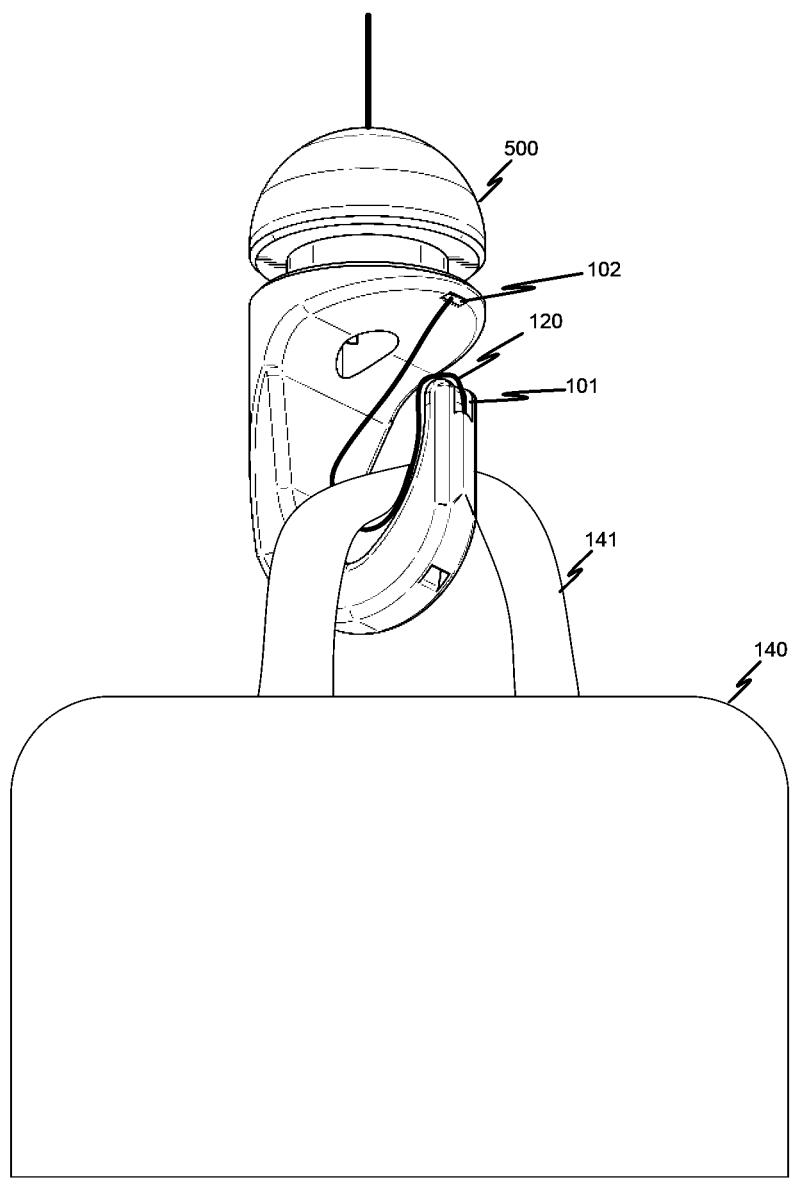
FIG. 5A is an example diagram of a payload release apparatus hooked to a payload, implemented in accordance with an embodiment.

FIG. 5A is an example diagram of a payload release apparatus 500 hooked to a payload 140, implemented in accordance with an embodiment. In some embodiments, the PRA 500 is connected to a tether 125, the tether 125 further connected to an unmanned aerial vehicle.

In an embodiment, a payload 140 includes a payload handle 141. In certain embodiments, the payload handle 141 includes a loop, a plurality of loops, and the like, which are utilized to hook onto the PRA 500. For example, according to an embodiment, the handle 141 applies pressure to the elastic member 120, resulting in an elastic deformation which allows the handle 141 to hook onto the PRA 500.

In certain embodiments, the elastic deformation of the elastic member 120 remains while the payload 140 is suspended in the air, as the force generated by the mass of the payload is greater than the force required to negate the elastic deformation. Once the payload touches the ground, the normal force negates the mass of the payload, according to an embodiment. In some embodiments, as the only mass which generates force on the elastic member is now a result of the weight of the handle 141, the elastic member 120 contracts into the relaxed state, thereby expelling the handle 141 from the PRA 500.

Figure 5B:
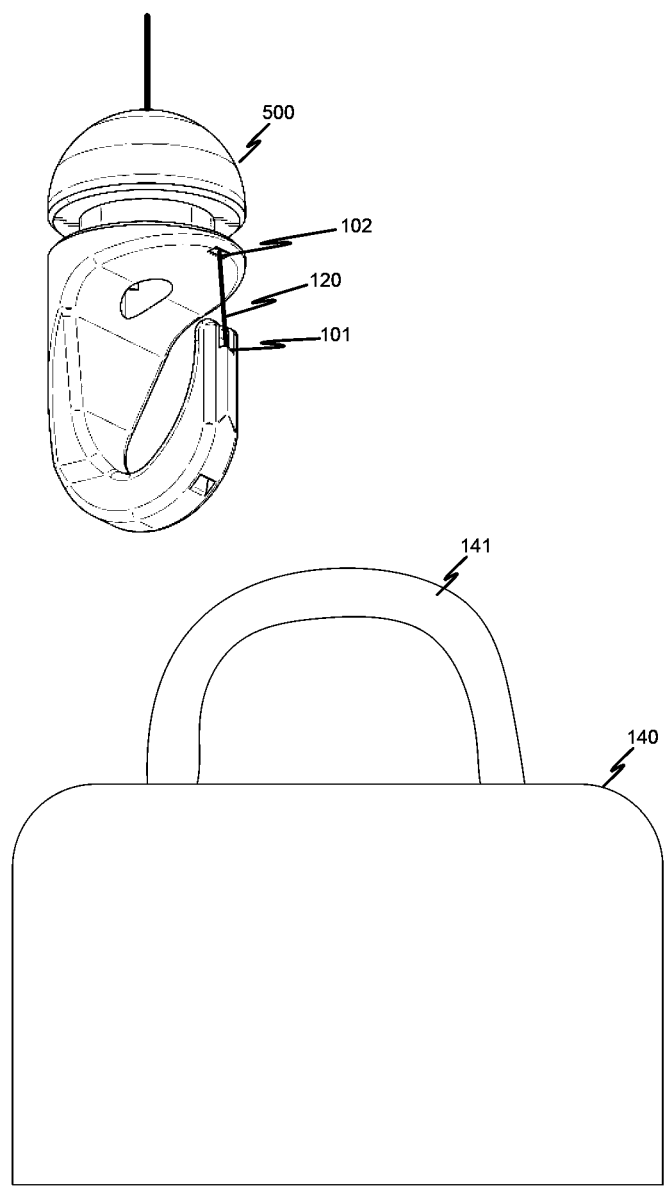
FIG. 5B is an example diagram of a payload release apparatus after decoupling from a payload, implemented in accordance with an embodiment.

FIG. 5B is an example diagram of a payload release apparatus 500 after decoupling from a payload 140, implemented in accordance with an embodiment. The elastic member 120 of the PRA 500 expels the handle 141 of the payload 140 once the payload 140 touches the ground. This is advantageous as it ensures that the payload is no longer connected to the PRA 500, therefore not connected to the tether, and thus not connected to the drone.

According to an embodiment, this allows the drone to expediently deliver a payload while ensuring its detachment. In an embodiment, a UAV is equipped with an optical distance measuring device, such as a laser distance measurer. A control circuitry of the UAV is configured, according to an embodiment, to determine an amount of tether which should be released by the UAV based on a measurement of the laser distance measurer.

For example, in an embodiment the control circuitry is configured to determine how much tether is released as a function of a speed at which a winch spins. In an embodiment, the speed of a winch is determined, for example, by detecting a voltage applied to a motor coupled with the winch.

Figure 6:
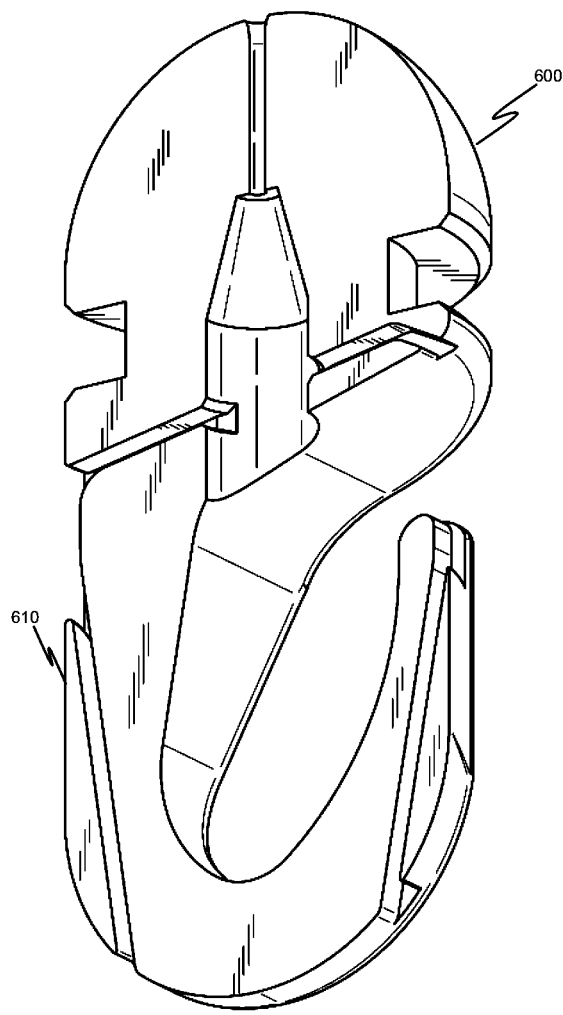
FIG. 6 is an example of a payload release apparatus half, implemented in accordance with an embodiment.

FIG. 6 is an example of a payload release apparatus half 600, implemented in accordance with an embodiment. Certain embodiments of the PRA include a plane of symmetry. In some embodiments, manufacturing a PRA is performed by manufacturing two parts which have a mirror symmetry, inserting an elastic member at least at the first anchor 101 and second anchor 102, and coupling the two parts together. The PRA half 600 is aligned with a mirror PRA half, for example at the shank 610, according to an embodiment.

Figure 7:
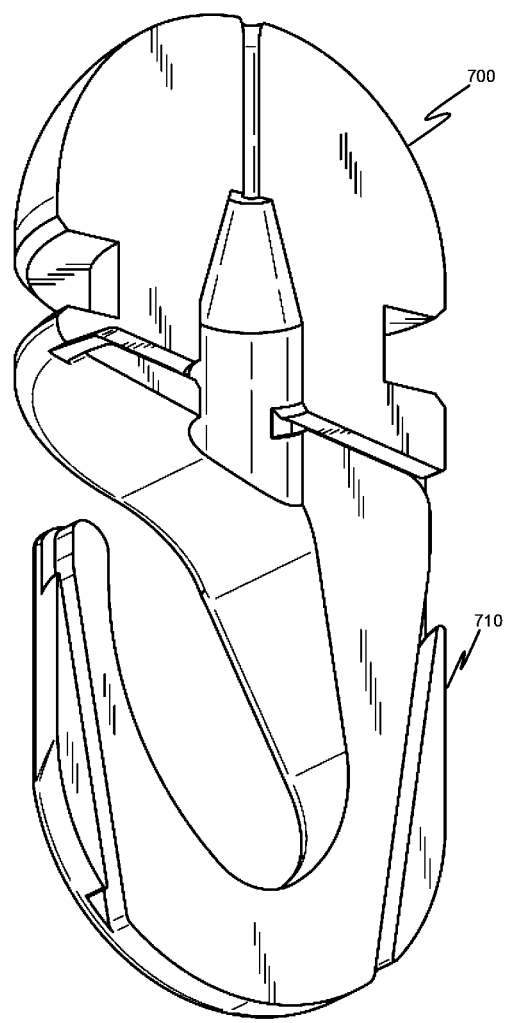
FIG. 7 is an example of a mirror payload release apparatus half, implemented in accordance with an embodiment.

FIG. 7 is an example of a mirror payload release apparatus half 700, implemented in accordance with an embodiment. In certain embodiments, the PRA half 600 and the mirror PRA half 700 each have slits, so that when the PRA half 600 and the mirror PRA half 700 are coupled, each slit and mirror slit are combined to create a channel through which an elastic member may be inserted. In an embodiment, manufacturing a PRA as a pair of components may be advantageous, for example as it allows to manufacture the PRA by utilizing injection molding techniques. Such techniques are not suited for manufacturing hollow channels, such as illustrated in the embodiments above. For the embodiments described above, additive manufacturing techniques, such as 3D printing, may be more suited. However, where such techniques are more expensive when scale of production is required, therefore, injection molding manufacturing may present a cheaper alternative for some embodiments.

Figure 8:
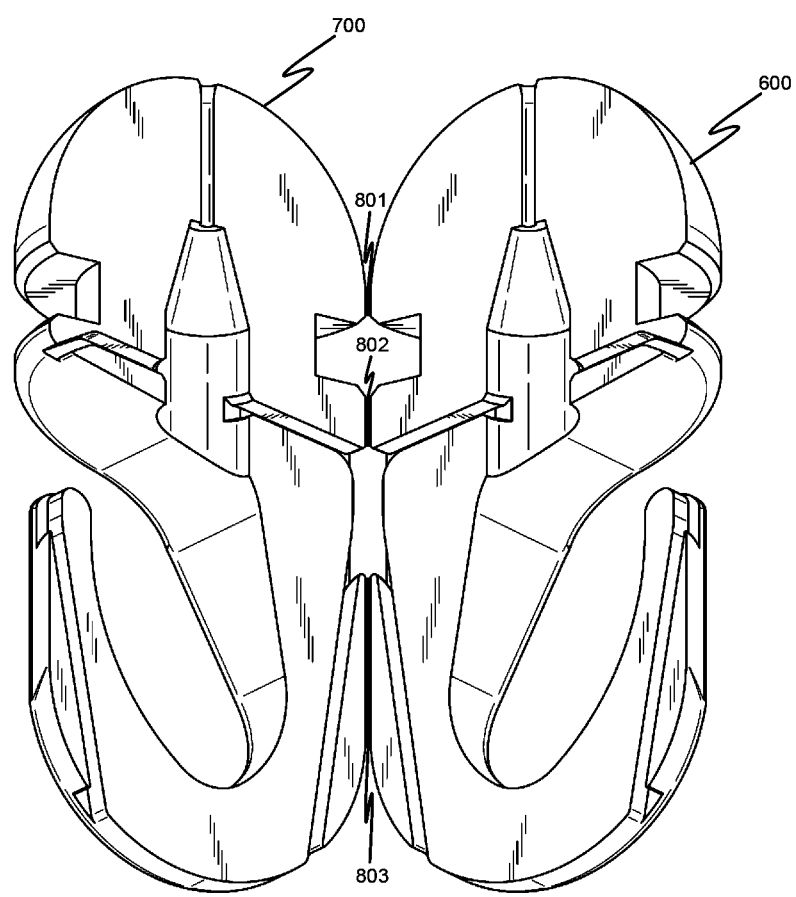
FIG. 8 is an example diagram of an uncoupled payload release apparatus, implemented in accordance with an embodiment.

FIG. 8 is an example diagram of an uncoupled payload release apparatus, implemented in accordance with an embodiment. The PRA half 600 and the mirror PRA half 700 are connected along the shank, for example by a thin plastic layer, which is plastically deformed when coupling the two halves, according to an embodiment.

In an embodiment, the shank includes a plurality of connections, such as connection 801 at the top portion of the PRA, connection 802 at a top portion of the shank, and connection 803 at a bottom portion of the shank. A PRA manufactured in this way is easier to assemble as the parts are already connected at least on one end, therefore coupling involves applying the plastic deformity, in an embodiment. Optionally, the coupling is performed using an adhesive, a mechanical fastener, a combination thereof, and the like.

Figure 9:
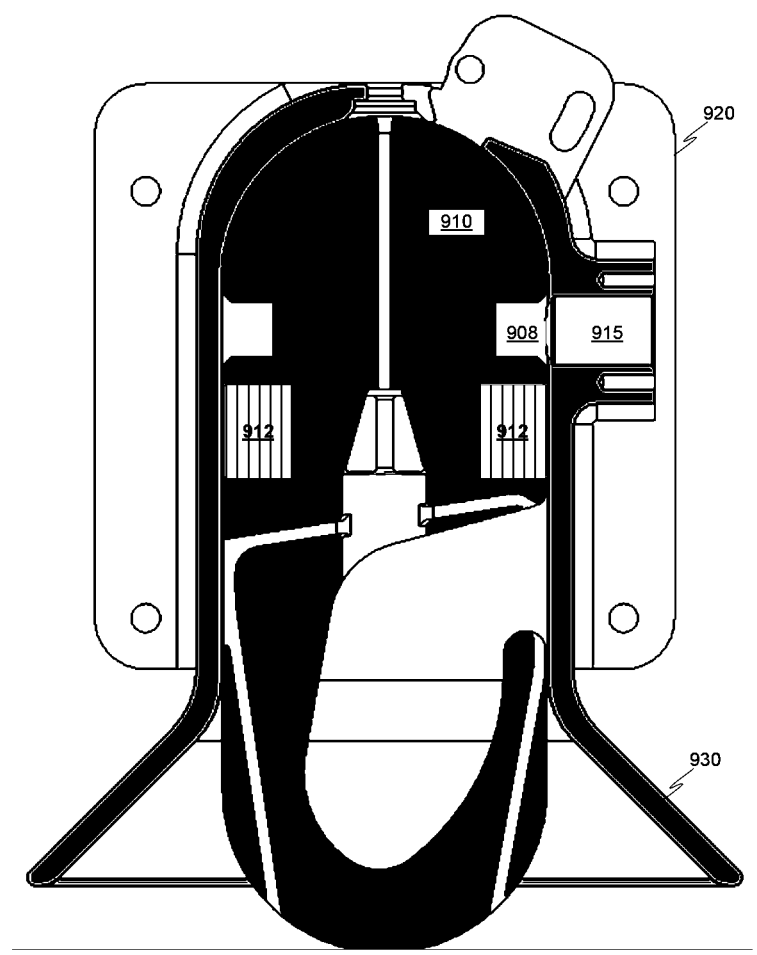
FIG. 9 is an example diagram of a cross section side view of a payload release apparatus in a housing, implemented in accordance with an embodiment.

FIG. 9 is an example diagram of a cross section side view of a payload release apparatus 910 in a housing 920, implemented in accordance with an embodiment. A payload release apparatus (PRA) 910 includes a slit 908, which is similar to the slit 108 of FIG. 1 above, according to an embodiment.

In an embodiment, the PRA 910 further includes a weighted portion 912. The weighted portion includes a material which is different in composition than a material which is used for the PRA 910, according to an embodiment. For example, in an embodiment, the PRA 910 is manufactured utilizing polylactic acid (PLA) plastic, and the weighted portion 912 includes an iron core. In an embodiment, the weighted portion is ferromagnetic, non-magnetic, and the like.

In an embodiment, the housing 920 includes a hollow portion defined by a surface 930, which is compatible for receiving therein the PRA 910. According to an embodiment, the surface 930 includes a perforation 915, through which a stopper is put in place occupying the perforation 915 and at least a portion of the slit 908, so that the PRA 910 cannot exit the hollow portion. In an embodiment, the stopper is moved through the perforation 915, for example by an actuator (not shown), a spring, and the like, so that the stopper at least partially protrudes into the slit 908.

As used herein a channel is a hollow portion defined by a first opening and a second opening, unless stated otherwise.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A payload release apparatus (PRA), comprising:
a top portion, the top portion including a connector adapted to connect to a first end of a tether;
a hook portion connected to the top portion, the hook portion including: a shank, a vertex, a high point, and a gap defined between the high point and the shank;
an elastic member, the elastic member blocking the gap defined between the high point and the shank of the hook portion, the elastic member having a relaxed position and a stretched position;
a first anchor placed at the top portion; and
a second anchor placed on the high point, wherein the elastic member is connected to the first anchor and to the second anchor.

2. The PRA of claim 1, further comprising:
a first channel extending from an opening of the first anchor to a top back opening of the hook portion;
a second channel extending from the top back opening to a bottom back opening of the hook portion; and
a third channel extending from a bottom front opening of the hook portion and an opening at the high point of the hook portion, wherein the elastic member is position in the first channel, the second channel, and the third channel.

3. The PRA of claim 1, further comprising:
a stopper connected to the tether, wherein the stopper is further connected to the connector.

4. The PRA of claim 3, wherein the connector includes a chamber, the chamber having a cross section which is equal to a cross section of the stopper.

5. The PRA of claim 4, wherein the cross section of the stopper has a trapezoidal shape.

6. A payload release apparatus (PRA), comprising:
a top portion, the top portion including a connector adapted to connect to a first end of a tether;
a hook portion connected to the top portion, the hook portion including: a shank, a vertex, a high point, and a gap defined between the high point and the shank;
an elastic member, the elastic member blocking the gap defined between the high point and the shank of the hook portion, the elastic member having a relaxed position and a stretched position; and
a stopper connected to the tether, wherein the stopper is further connected to the connector, wherein the connector includes a chamber, the chamber having a cross section which is equal to a cross section of the stopper.

7. The PRA of claim 6, wherein the cross section of the stopper has a trapezoidal shape.

8. The PRA of claim 6, further comprising:
a first anchor placed at the top portion; and
a second anchor placed on the high point, wherein the elastic member is connected to the first anchor and to the second anchor.

9. The PRA of claim 6, further comprising:
a first channel extending from an opening of a first anchor to a top back opening of the hook portion;
a second channel extending from the top back opening to a bottom back opening of the hook portion; and
a third channel extending from a bottom front opening of the hook portion and an opening at the high point of the hook portion, wherein the elastic member is position in the first channel, the second channel, and the third channel.

* * * * *